United States Patent [19]
Robinson

[11] Patent Number: 5,411,581
[45] Date of Patent: May 2, 1995

[54] GAS SEPARATION APPARATUS

[75] Inventor: Graham B. Robinson, Godalming, England

[73] Assignee: The BOC Group plc, Windlesham, United Kingdom

[21] Appl. No.: 179,863

[22] Filed: Jan. 11, 1994

[30] Foreign Application Priority Data

Jan. 14, 1993 [GB] United Kingdom ............... 9300631

[51] Int. Cl.6 ............... B01D 53/22; B01D 53/04
[52] U.S. Cl. ............... 96/8; 96/135; 96/140; 96/142
[58] Field of Search ............... 95/45, 54, 117; 96/4, 96/7–10, 108, 134, 135, 137, 140–142

[56] References Cited

U.S. PATENT DOCUMENTS

| | | | |
|---|---|---|---|
| Re. 33,678 | 9/1991 | Campbell et al. | 96/4 X |
| 2,815,320 | 12/1957 | Kollsman | 96/7 X |
| 2,854,394 | 9/1958 | Kollsman | 96/7 X |
| 3,674,435 | 7/1972 | VanLuik, Jr. et al. | 96/4 X |
| 3,976,451 | 8/1976 | Blackmer et al. | 96/7 |
| 4,040,805 | 8/1977 | Nelms et al. | 96/4 |
| 4,681,602 | 7/1987 | Glenn et al. | 96/4 X |
| 4,881,953 | 11/1989 | Prasad et al. | 96/10 X |
| 5,004,482 | 4/1991 | Haas et al. | 96/4 X |
| 5,205,842 | 4/1993 | Prasad | 95/54 X |
| 5,344,480 | 9/1984 | Schulte et al. | 96/7 X |

FOREIGN PATENT DOCUMENTS

| | | | |
|---|---|---|---|
| 0438214 | 7/1991 | European Pat. Off. | 96/7 |
| 2-221102 | 9/1990 | Japan | 96/4 |
| 3-186315 | 8/1991 | Japan | 96/8 |

*Primary Examiner*—Robert Spitzer
*Attorney, Agent, or Firm*—David M. Rosenblum; Larry R. Cassett

[57] ABSTRACT

A gas separation apparatus employing a membrane gas separation unit and containing a regenerative desiccant for preventing any free water contacting the membranes within the membrane separation unit.

3 Claims, 1 Drawing Sheet

GAS SEPARATION APPARATUS

FIELD OF THE INVENTION

The present invention relates to gas separation apparatus and in particular to apparatus for separating air by means of semi-permeable membranes through which the components of the air diffuse at different speeds.

BACKGROUND OF THE INVENTION

The use of semi-permeable membranes to separate gas mixtures has become a well known technique in the production of industrial gases. Known plants for the separation of gas mixtures, for example, air, by such membranes are constructed so as to present a large surface area of membrane to the air to be separated.

For example, such plants may employ a multitude of identical, elongate, hollow fibres which are formed from a suitable semi-permeable membrane and which extend in parallel to one another. The fibres are usually mounted in and typically extend from one end to the other of a pressure vessel. The air to be separated is fed under pressure into a header at or adjacent one end of the fibres so that it flows longitudinally through the fibres. The insides of the fibres are maintained at a higher pressure than that which obtains on the outside of the fibres. The components of the air diffuse through the membranes at different speeds such that as the air passes along the inside of a membrane so a faster permeating component, for example, oxygen, passes more and more to the low pressure side. Accordingly, a nitrogen rich product gas in the order of 99.5% by volume nitrogen may be withdrawn under pressure from the end of the pressure vessel opposite that at which the feed gas is introduced.

It is known that water vapour has no deleterious effect on the membranes and in fact the membranes are effective at removing water vapour from the nitrogen product gas stream.

However, free water tends to block the membranes pores because the fibre ends are blocked irreversibly by capillary action.

In order to overcome this problem it is known to incorporate in a gas separation apparatus a coalescing filter upstream of the pressure vessel containing the membranes. This produces saturated air which, if allowed to cool, will cause water condensation. Therefore, a preheater to the air feed is often incorporated also.

In practice this preheater only operates when the compressor is operating and there is frequently a danger of free water hitting the membranes before the system has reached a steady state temperature.

It is an aim of the present invention to remove this danger by incorporating in a gas separation apparatus a regenerative desiccant.

SUMMARY OF THE INVENTION

According to the present invention, a gas separation apparatus comprises a compressor for feeding a feed gas under pressure to a membrane gas separation unit containing one or more semi-permeable gas separation membranes and a member containing a regenerative desiccant for preventing any free water in the compressed feed gas contacting the membranes.

Preferably, the or each semi-permeable gas separation membrane is tubular and has an inlet end for receiving the feed gas which is provided with an end cap packed with the regenerative desiccant.

Preferably, integrally mounted within the or each end cap is a sintered brass filter for precluding particulate material.

BRIEF DESCRIPTION OF THE DRAWINGS

An embodiment of the invention will now be described by way of example, reference being made to the Figures of the accompanying diagrammatic drawings in which.

DETAILED DESCRIPTION

Figure 1:
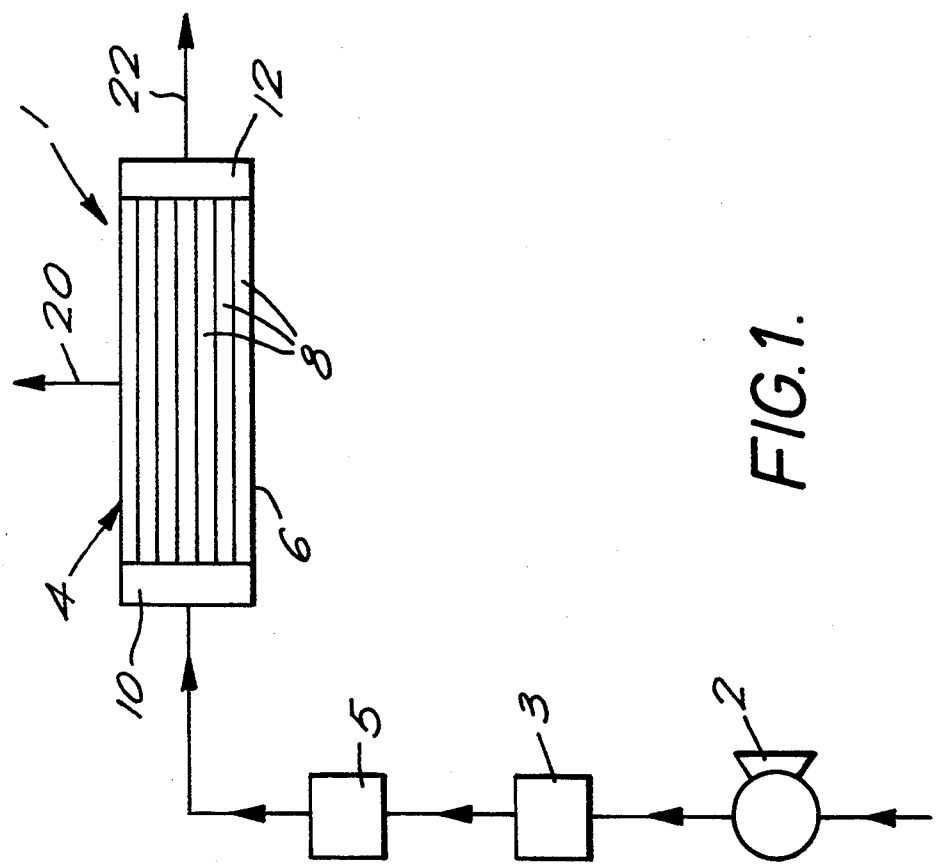
FIG. 1 is a flow diagram illustrating a gas separation apparatus including a membrane separation unit.

As shown in FIG. 1, a gas separation apparatus 1 for the separation of air to produce nitrogen as a product gas includes a compressor 2 and a membrane separation unit 4. Between the compressor 2 and the membrane separation unit 4 there is located a coalescing filter 3 and a preheater 5 in a manner known per se.

The membrane separation unit 4 comprises a pressure vessel 6 containing a plurality of semi-permeable tubular gas separation membranes 8 arranged in parallel end-to-end of the vessel 6. Each tubular gas separation membrane 8 is typically in the form of a hollow fibre, able to separate air to produce a nitrogen product gas. Each end of each membrane 8 communicates with a header 10, 12 at the inlet and outlet ends respectively of the pressure vessel 6. The pressure vessel has a first outlet 20 for waste permeate gases and a second outlet 22 for product gas.

Figure 2:
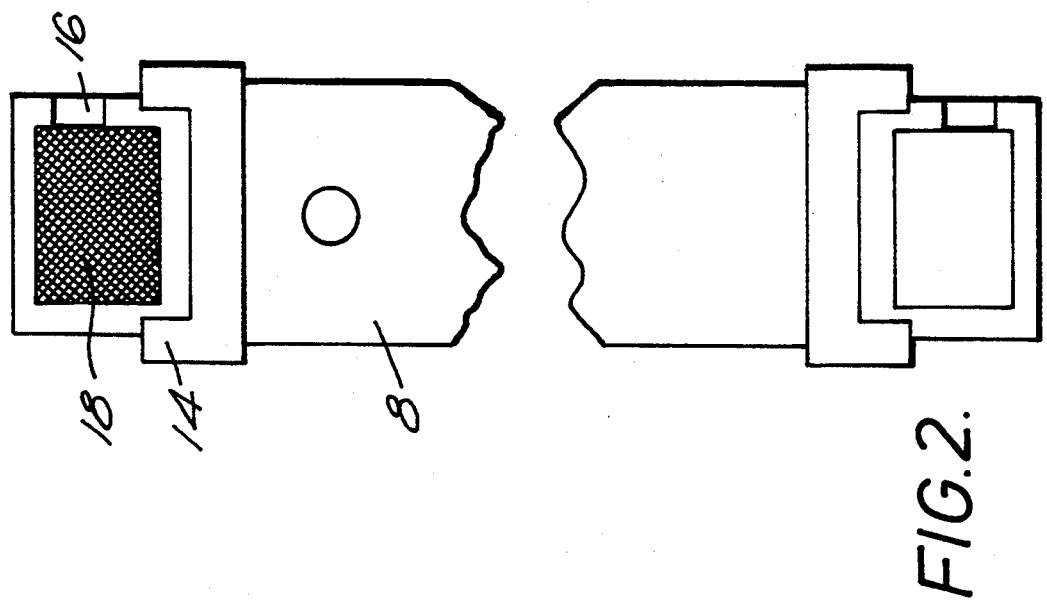
FIG. 2 is an exploded elevation of a tubular gas separation membrane forming part of the membrane separation unit shown in FIG. 1.

Turning now to FIG. 2, at the inlet end of each membrane 8 is an end cap 14 which includes a side inlet port 16. Integral with the end cap 14 and immediately adjacent the inlet 16 is a sintered brass filter 18. The end cap is also packed with a regenerative desiccant, for example, silica gel.

In use, air under pressure from the compressor 2 flows first through the coalescing filter 3 and the preheater 5 and hence into the inlet header 10 of the pressure vessel 6. From the inlet header 10 the air enters the inlets 16 and passes through each tubular gas separation membrane 8. The air under pressure passes first through the sintered brass filter 18 to remove particulates and hence through the packing of regenerative desiccant in order to remove any free water that might be present in the air. The air passes along each membrane 8 such that the components of the air other than nitrogen diffuse through the membranes more rapidly than the nitrogen itself and leave the pressure vessel via the first outlet 20. The product nitrogen enters the header 12 and exists the pressure vessel 6 via second outlet 22.

It has been found that the desiccant adsorbs any free water in the feed air during start up of the compressor 2. However, once the system has reached a steady temperature the relative humidity of the feed air drops and desorbs the moisture from the regenerative desiccant.

It will be evident that the regenerative desiccant prevents or substantially prevents any free water remaining in the feed air after passing through the preheater 5 from contacting the membranes 8.

Although the above described embodiment makes reference to the use of a plurality of tubular, semi-permeable gas separation membranes; other configurations of membranes can be used. If non-tubular membranes are used then a separate member or cartridge containing the regenerative desiccant can be located between the preheater 5 and the membrane separation unit. Such a cartridge could incorporate a sintered brass filter.

I claim:

1. A gas separation apparatus comprising: a membrane gas separation unit containing one or more semi-permeable gas separation membranes; said membrane gas separation unit of tubular configuration and having an inlet end for receiving the feed gas: a compressor for feeding a feed gas under pressure to said membrane gas separation unit; and an end cap packed with a regenerative desiccant interposed between said compressor and membrane gas separation unit for preventing any free water in the feed gas from contacting the membranes.

2. The gas separation apparatus as claimed in claim 1, in which said end cap comprises a sintered brass filter for the removal of particulate material.

3. The gas separation apparatus as claimed in claim 1, further comprising a coalescing filter and a preheater located between said member and said compressor.

* * * * *